(12) United States Patent
Kreutz et al.

(10) Patent No.: US 11,395,494 B2
(45) Date of Patent: Jul. 26, 2022

(54) LARVICIDE COMPOSITIONS AND METHODS

(71) Applicant: Fernando Thome Kreutz, Porto Alegre (BR)

(72) Inventors: Fernando Thome Kreutz, Porto Alegre (BR); Ana Leticia de Souza Vanz, Porto Alegre (BR)

(73) Assignee: Fernando Thome Kreutz, Porto Alegre (BR)

( * ) Notice: Subject to any disclaimer, the term of this patent is extended or adjusted under 35 U.S.C. 154(b) by 114 days.

(21) Appl. No.: 16/462,392

(22) PCT Filed: Nov. 18, 2017

(86) PCT No.: PCT/IB2017/057242
§ 371 (c)(1),
(2) Date: May 20, 2019

(87) PCT Pub. No.: WO2018/096434
PCT Pub. Date: May 31, 2018

(65) Prior Publication Data
US 2019/0269139 A1 Sep. 5, 2019

Related U.S. Application Data

(60) Provisional application No. 62/425,408, filed on Nov. 22, 2016.

(51) Int. Cl.
*A01N 63/00* (2020.01)
*A01N 63/23* (2020.01)

(52) U.S. Cl.
CPC .................................. *A01N 63/23* (2020.01)

(58) Field of Classification Search
None
See application file for complete search history.

(56) References Cited

U.S. PATENT DOCUMENTS

| 4,631,857 | A | 12/1986 | Kase et al. | |
| 2005/0244394 | A1* | 11/2005 | DeChant | A01N 63/50 |
| | | | | 424/93.461 |

FOREIGN PATENT DOCUMENTS

| AU | 2011201771 | | 5/2011 | |
| AU | 2011201771 | A1* | 5/2011 | A01N 53/00 |
| EP | 0414404 | A2* | 2/1991 | C12N 1/04 |
| EP | 0414404 | A2 | 2/1991 | |
| EP | 0761096 | A1* | 3/1997 | A01N 63/00 |
| EP | 0761096 | A1 | 3/1997 | |

OTHER PUBLICATIONS

International Preliminary Report on Patentability corresponding to International Application No. PCT/IB2017/057242 dated May 28, 2019, 7 pages.
"Written Opinion and International Search Report corresponding to International Patent Application No. PCT/IB2017/057242, dated May 7, 2018, 11 pages".
Brar, et al., ""Development of sludge based stable aqueous Bacillus thuringiensis formulations" Water science and technology: a journal of the International Association on Water Pollution Research, 50(9):229-236, (2004) abstract".

* cited by examiner

*Primary Examiner* — Jana A Hines
*Assistant Examiner* — Khatol S Shahnan Shah
(74) *Attorney, Agent, or Firm* — Myers Bigel, P.A.

(57) ABSTRACT

In aspect, a ready-to-use liquid larvicide composition comprises, consists essentially of, or consists of *Bacillus thuringiensis* (Bt) fermentate, propionic acid, and water. In other aspects, a composition comprises a fragrance and/or oil, a surfactant, an aqueous medium, and a larvicide.

8 Claims, 3 Drawing Sheets

LARVICIDE COMPOSITIONS AND METHODS

STATEMENT OF PRIORITY

This application is a 35 U.S.C. § 371 national phase application of International Application Serial No. PCT/IB2017/057242, filed Nov. 18, 2017, which claims the benefit, of U.S. Provisional Patent Application No. 62/425,408, filed Nov. 22, 2016, the entire contents of each of which are incorporated by reference herein.

FIELD

The present invention relates to larvicides. More specifically, the present invention is, in aspects, concerned with compositions and methods involving the use of a *Bacillus thuringiensis* fermentate in a ready-to-use, non-concentrated, liquid formulation and/or in combination with fragrant and/or insect repellant nanoemulsions.

BACKGROUND

Mosquito-borne diseases, such as Dengue and Zika virus, are a major public health challenge. The larvicide *Bacillus thuringiensis* var. *israelensis* (Bti), a natural soil bacterium, has become a great asset in biological pest control. Bti is typically applied directly in the breeding and water reservoirs. During bacteria sporulation, a crystal protein called delta-endotoxin Cry in formed. Mosquito larvae ingest this protein, which acts on their gastro-intestinal tract and leads to larvae death.

Existing Bti formulations are generally complex and formulated for large-scale use, rather than for easy domestic use. For example, U.S. Patent Application Publication No. 2005/0244394 describes a method for controlling Dipteran larvae or a method for inhibiting the development of larvicidal resistance, controlling resistant populations and reducing resistance levels in Diptera by introducing a larvicidally-effective amount of a combination of a strain of *Bacillus thuringiensis* subspecies *israelensis* and a strain of *Bacillus sphaericus* into an environment containing Dipteran larvae.

U.S. Pat. No. 4,631,857 describes a molded non-layered unitary article (serving as a larvicide carrier) that is formed solely from a substantially homogeneous mixture consisting of cork particles and a molding-type of plaster into which a larvicidal micro-organism, such as Bti, has been added. The article may be dispensed conveniently, on to either small or large bodies of water, without regard for its orientation relative to the body of water. The article has a specific gravity of less than 1.0 and floats freely on the surface of the water, but if desired, may have a restrained-floating application.

Existing commercial Bti formulations are generally formulated as concentrated liquids (such as Teknar™ HP-D), as granular water-soluble formulations (such as Teknar™ WS), or as floating sustained release briquette formulations (such as Mosquito Dunks™).

There is a need for alternative compositions to overcome or mitigate at least some of the deficiencies of the prior art, or to provide a useful alternative.

SUMMARY

In accordance with an aspect, there is provided a ready-to-use liquid larvicide composition comprising *Bacillus thuringiensis* (Bt) fermentate, propionic acid, and water.

In accordance with an aspect, there is provided a ready-to-use liquid larvicide composition consisting essentially of *Bacillus thuringiensis* (Bt) fermentate, propionic acid, and water.

In accordance with an aspect, there is provided a ready-to-use liquid larvicide composition consisting of *Bacillus thuringiensis* (Bt) fermentate, propionic acid, and water.

In an aspect, the Bt is subsp. *israelensis*.

In an aspect, the Bt fermentate is used in an amount of from about 0.56 to about 0.75% w/w of the composition.

In an aspect, the Bt fermentate is used in an amount of about 0.66% w/w of the composition.

In an aspect, the propionic acid is used in an amount of from about 0.6 to about 0.9% w/w of the composition.

In an aspect, the propionic acid is used in an amount of about 0.8% w/w of the composition.

In an aspect, the water is used in an amount of from about 83.75 to about 113.32% w/w of the composition.

In an aspect, the water is used in an amount of about 98.54% w/w of the composition.

In an aspect, the composition further comprises a fragrant oil or plant extract.

In an aspect, the composition further comprising an insect repellant oil or plant extract.

In an aspect, the composition has at least one of the following characteristics: a colour of light brown; a pH of about 3.10; a density of about 1.003 g/ml; a viscosity of about 15 cP at 25° C.; and water soluble.

In accordance with an aspect, there is provided a non-concentrated product bottled in a spray-bottle for ready-to-use domestic application, the product comprising the composition described herein.

In accordance with an aspect, there is provided a spray bottle comprising less than about one liter of the composition described herein.

In accordance with an aspect, there is provided a method of killing mosquito larvae, the method comprising spraying the composition described herein on standing water.

In an aspect, about 3 sprays of the composition is applied for each 1 liter of water.

In an aspect, 3 sprays is about 2.25 ml of the composition.

In accordance with an aspect, there is provided a method of making the composition described herein, the method comprising:
  fermenting the Bt until it reaches stationary phase and begins to sporulate and produce Cry proteins, thereby producing a Bt fermentate;
  slowly mixing the Bt fermentate with a portion of the water;
  adding the propionic acid;
  mixing the resulting composition with the remainder of the water.

In an aspect, method of claim 19, wherein the Bti is cultured at about 30° C., with agitation of about 200 rpm, and at pH 7.0.

In an aspect, the portion of the water is about one third of the water.

In accordance with an aspect, there is provided a composition comprising a fragrance and/or oil, a surfactant, an aqueous medium, and a larvicide.

In an aspect, the composition is a nanoemulsion.

In an aspect, the composition is free of lower alkyl alcohols.

In an aspect, the composition is an insect repellant.

In an aspect, the surfactant comprises oleth-20, laureth-2, laureth-4, laureth-23, or a combination thereof.

In an aspect, the surfactant consists of oleth-20 and laureth-2, oleth-20 and laureth-4, laureth-23 and laureth-4, or laureth-23 and laureth-2.

In an aspect, the surfactant consists of oleth-20.

In an aspect, the surfactant is present in the composition in a total amount of from about 0.5% w/w to about 20% w/w, such as from about 0.5% w/w, about 1% w/w, about 2% w/w, about 3% w/w, about 4% w/w, about 5% w/w, about 6% w/w, about 7% w/w, about 8% w/w, about 9% w/w, about 10% w/w, about 11% w/w, about 12% w/w, about 13% w/w, about 14% w/w, about 15% w/w, about 16% w/w, about 17% w/w, about 18% w/w, or about 19% w/w to about 1% w/w, about 2% w/w, about 3% w/w, about 4% w/w, about 5% w/w, about 6% w/w, about 7% w/w, about 8% w/w, about 9% w/w, about 10% w/w, about 11% w/w, about 12% w/w, about 13% w/w, about 14% w/w, about 15% w/w, about 16% w/w, about 17% w/w, about 18% w/w, about 19% w/w, or about 20% w/w.

In an aspect, the surfactant is present in the composition in a total amount of from about 5% w/w to about 18% w/w or from about 6% w/w to about 17% w/w.

In an aspect, the fragrance and/or oil is present in the composition in an amount of from about 0.1% to about 30% w/w, such as from about 0.1%, about 0.5%, about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, or about 29% to about 0.5%, about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, or about 30% w/w.

In an aspect, the fragrance and/or oil is present at about 10%.

In an aspect, the fragrance and/or oil is present at about 5% or at about 2%.

In an aspect, the fragrance comprises an essential oil.

In an aspect, the essential oil is citronella oil or lemongrass oil.

In an aspect, the oil is andiroba oil.

In an aspect, the composition further comprises a preservative.

In an aspect, the preservative is selected from antimicrobial agents, organic acids, small carboxylic acids and salts thereof, formaldehyde-releasers, isothiazolinones, phenoxyethanol, caprilyl glycol, and combinations thereof.

In an aspect, the composition further comprising an antioxidant.

In an aspect, the antioxidant is selected from ascorbic acid, erythorbic acid, a botanical extract, such as rosemary extract, green tea extract, or other extract containing a polyphenol antioxidant, vitamin E, tocopherols, ascorbyl palmitate, butylated hydroxyanixole (BHA), butylated hydroxytoluene (BHT), pentaerythrityl tetra-di-t-butyl hydroxyhydrocinnamate, and combinations of any thereof.

In an aspect, the aqueous medium is water.

In an aspect, the composition is non-turbid.

In an aspect, the composition is stable.

In an aspect, the composition is free of an oleth-based surfactant.

In an aspect, the composition is free of oleth-20.

In an aspect, the composition is free of a steareth-based surfactant.

In an aspect, the composition is free of steareth-20 and/or steareth-21.

In an aspect, the composition is free of glycols.

In an aspect, the composition is free of an ionic surfactant.

In an aspect, the composition is free of ester surfactants.

In an aspect, the composition is free of ester ether surfactants.

In an aspect, the composition is free of pegylated fatty acids.

In an aspect, the composition is free of fatty acids.

In accordance with an aspect, there is provided a kit comprising the composition described herein together with a nanoemulsion composition comprising a fragrance and/or oil, a surfactant, and an aqueous medium, wherein the nanoemulsion composition is free of lower alkyl alcohols.

In accordance with an aspect, there is provided a method of reducing mosquito populations and/or reducing the spread of mosquito-borne disease, the method comprising applying the composition described herein to a mosquito habitat.

In an aspect, the method further comprises applying an insect repellant to a mosquito habitat in the vicinity thereof concurrently or sequentially.

In an aspect, the insect repellant comprises a nanoemulsion composition comprising a fragrance and/or oil, a surfactant, and an aqueous medium.

In an aspect, the nanoemulsion composition is free of lower alkyl alcohols.

In an aspect, reduction in mosquito populations and/or spread of mosquito-borne disease is synergistic when both compositions are used in combination.

Other features and advantages of the present invention will become apparent from the following detailed description. It should be understood, however, that the detailed description and the specific examples while indicating embodiments of the invention are given by way of illustration only, since various changes and modifications within the spirit and scope of the invention will become apparent to those skilled in the art from said detailed description.

DESCRIPTION OF THE FIGURES

The present invention will be further understood from the following description with reference to the Figures, in which:

FIG. 1 shows the results of larvae mortality tests conducted in Example 1.

FIG. 2 shows the results of larvae mortality tests conducted in Example 1.

FIG. 3 shows the results of larvae mortality tests conducted in Example 1.

DETAILED DESCRIPTION

Although Bt compositions are known, they are becoming increasingly complex and individuals lack easy access to such compositions for simple domestic use. Described herein are compositions and methods that use a simple, non-concentrated, Bt formulation available in a ready-to-use spray bottle for safe and effective domestic use. In addition, described herein are compositions and methods that combine Bt larvicides with nanoemulsion fragrance and/or insect repellant compositions that counteract at least in part objectionable odours in the Bt larvicides and/or act with the Bt larvicides to reduce the spread of mosquito-borne disease.

Larvicide Compositions

The compositions described herein generally contain a *Bacillus thuringiensis* (Bt) fermentate, which comprises Bt, Bt spores, and one or more crystal proteins produced by the Bt, in combination with a diluent.

The Bt used in the compositions and methods described herein may be of any Bt subspecies that produces larvicidal crystal proteins. For example, the Bt subspecies may be selected from the group consisting of *aizawai, alesti, berliner, cameroun, canadiensis, colmeri, coreanensis, dakota, darmstadiensis, dendrolimus, entomocidus, finitimus, fukuokaensis, galleriae, higo, indiana, israelensis, japonensis, japonensis buibui, jegathesan, kenyae, kumamotoensis, kunthala, kurstaki, kyushuensis, medellin, mexcanensis, morrisoni, nigeriae, neoleonensis, ongbei, ostriniae, pakistani, pondicheriensis, roskildiensis, san diego, shandogiensis, shanghai, silo, sotto, subtoxicus, tenebrionis, thompsoni, thuringiensis, tochigiensis, tohokuensis, tolworthi, toumanoffi, yunnanensis, wuhanensis*, and combinations thereof. Typically, the Bt subspecies is selected from *berliner, israelensis, kurstaki, tenebrionis*, and combinations thereof. More typically, the Bt subspecies is *Bacillus thuringiensis* subsp. *israelensis* (Bti).

As is known, when Bt bacteria enter the stationary phase of growth, they begin to sporulate and produce crystal (or Cry) proteins. These are well known to a skilled person and it will be understood that any such crystal proteins may be included in the compositions described herein. Typically the crystal proteins are not added separately to the composition but are, rather, derived from the bacteria within the fermentate. In an aspect, additional exogenous crystal proteins not derived from the bacteria in the fermentate may be included in the compositions described herein. In typical aspects, the Bt fermentate is derived from a culture that had been grown to stationary phase, such that the Bt began sporulate and produce crystal proteins.

In typical aspects, the Bt fermentate is used in amounts of from about 0.1% to about 5% w/w based on the total weight of the composition, such as from about 0.5% to about 2%, such as from about 0.5% to about 1%, such as from about 0.1%, about 0.2%, about 0.3%, about 0.4%, about 0.5%, about 0.6%, about 0.7%, about 0.8%, about 0.9%, about 1%, about 1.5%, about 2%, about 2.5%, about 3%, about 3.5%, about 4%, or about 4.5% to about 0.2%, about 0.3%, about 0.4%, about 0.5%, about 0.6%, about 0.7%, about 0.8%, about 0.9%, about 1%, about 1.5%, about 2%, about 2.5%, about 3%, about 3.5%, about 4%, about 4.5%, or about 5% w/w. Typically, the Bt fermentate is used in amounts of from about 0.56% to about 0.75% w/w, such as about 0.66% w/w.

The diluent used in the compositions described herein is typically water but could be any solvent known to a skilled person. Typically, the diluent is water soluble and/or biodegradable and therefore can be applied to water reservoirs without harm to the environment, such as flora and fauna other than the targeted insects. In aspects described below, a nanoemulsion and/or oil may be added to the compositions. In aspects, the nanoemulsion and/or oil may be used as the diluent.

In aspects, the compositions described herein comprise a preservative. Examples of preservatives include antimicrobial agents such as quaternary ammonium compounds, alcohols, chlorinated phenols, parabens and paraben salts, imidazolidinyl urea, phenoxyethanol, p-hydroxybenzoate, organic acids, small carboxylic acids like benzoic acid, citric acid, lactic acid, sorbic acid, salicylic acid, formic acid, propionic acid or corresponding salts. Formaldehyde-releasers and isothiazolinones may also be used. Typical non-limiting examples include DMDM hydantoin, diazolidinyl urea, imidazolidinyl urea, formaldehyde, propylparaben, ethylparaben, butylparaben, methylparaben, benzylparaben, isobutylparaben, phenoxyethanol, sorbic acid, benzoic acid, methylchloroisothiazolinone, methylisothiazolinone, methyl dibromoglutaronitrile, dehydroacetic acid, sodium bisulfite, dichlorophen, caprilyl glycol, salts of any of the foregoing compounds, and mixtures of any of the foregoing compounds. In typical aspects, the preservative comprises propionic acid.

The term "preservative" means a material that prevents the growth and or reacts with and/or destroys microorganisms that might damage or grow on or in the composition or otherwise contaminate it.

The preservative, when present, is typically used in an amount of from about 0.01% to about 5% w/w, such as from about 0.01%, about 0.05%, about 0.1%, about 0.15%, about 0.2%, about 0.25%, about 0.5%, or about 0.75% to about 0.05%, about 0.1%, about 0.15%, about 0.2%, about 0.25%, about 0.5%, about 0.75%, about 1%, about 2%, about 3%, about 4%, or about 5% w/w. Typically, the preservative is used in an amount of from about 0.5% to about 2%, such as from about 0.5% to about 1%, such as from about 0.6% to about 0.9%, such as about 0.8% w/w.

In addition, the compositions described herein may contain an oil or a plant extract, such as an essential oil or a rosemary or thyme extract. These components may assist in overcoming the objectionable odour of the preservative, such as propionic acid and/or may confer a desirable odour to the compositions so that the end user is encouraged to apply the compositions regularly and sufficiently to accomplish the desired larvicidal effect. Additional oils or extracts that may be incorporated into the compositions described herein are referred to below as being present within the nanoemulsions that may be added. It will be understood that any of the components described below may be incorporated into the compositions described herein singly, in any combination, or formulated as a nanoemulsion as described below.

In specific aspects, the compositions described herein may contain a nanoemulsion composition as described in PCT/BR2016/050253, which is incorporated herein by reference in its entirety. The nanoemulsion compositions typically comprise a fragrance and/or oil, a surfactant, and an aqueous medium. The nanoemulsion compositions may be formulated together with the larvicide compositions or the separate nanoemulsion and larvicide compositions may be provided together in a kit. In certain aspects, the nanoemulsion compositions have insect repellant abilities by virtue of incorporation of an oil such as andiroba oil, citronella oil, or lemongrass oil. In particular aspects, by combining the larvicidal compositions described herein with the insect repellant nanoemulsion compositions described in PCT/BR2016/05253, an additive or synergistic effect on reducing mosquitos in the vicinity in which the compositions were applied may be observed. In additional aspects, an additive or synergistic effect on reducing the spread of mosquito-borne disease may be observed.

As used herein, the term "fragrance" means any odoriferous material. In general, such materials are characterized by a vapour pressure less than the atmospheric pressure at room temperatures. The fragrances employed herein will most often be liquid at room temperatures, but also can be solid such as the various camphoraceous fragrances known in the art. A wide variety of chemicals are known for fragrance uses, including materials such as aldehydes, ketones, esters, alcohols, terpenes and the like. Naturally occurring plant and animal oils and exudates comprising complex mixtures of various chemical components are known for use as fragrances, and such materials can be used herein. The fragrances herein can be relatively simple in their composition or can comprise highly sophisticated, complex mixtures of natural and synthetic chemical components, all chosen to provide any desired odour.

Typical fragrances that can be used in the compositions and methods described herein comprise, for example, woody/earthy bases containing exotic materials such as sandalwood oil, civet, patchouli oil, and the like. Other suitable fragrances are for example light, floral fragrances, for example, rose extract, violet extract, and the like. Fragrances can be formulated to provide desirable fruity odours, for example, lime, lemon, orange, and the like.

Thus, the term fragrance includes natural products such as essential oils. As used herein, the term "essential oils" means any concentrated hydrophobic liquid containing volatile aromatic compounds from plants.

Essential oils are typically highly scented droplets found in minute quantities in the flowers, fruit, stems, leaves, roots, wood, resin, and bark of aromatic plants. Typically, essential oils are highly fluid and exceptionally volatile.

Essential oils are typically complex mixtures of different organic molecules and may comprise, for example, terpenes, alcohols, esters, aldehydes, ketones, and/or phenols. Synthetic fragrance oils are usually made from one or more of the constituents predominant within a particular essential oil; menthol, for example, often substitutes for mint and eucalyptol for eucalyptus.

Essential oils are typically recognized by their aromas and their compositions are typically determined through gas liquid chromatography (GLC). Essential oils can also have characteristic colours: eucalyptus is colourless; chamomile varies from white to blue; and others, such as basil and sandalwood (both light greenish-yellow), are in pastel shades. Yet others are richly pigmented, such as jasmine, which is a deep reddish-brown, patchouli, which is brown, and rose, which is orange-red.

Examples of essential oils include, but are not limited to, those extracted from anise, orange, basil, bergamot, birch, cajeput, chamomile (e.g., chamomile german, chamomile maroc, and chamomile roman), cinnamon (e.g., cinnamon zeylanicum), cedarwood, cyprus, citronella, dove buds, eucalyptus (e.g., *Eucalyptus globulus*), fennel seeds, clove leaves, geranium, juniper berry, incense, lavender, hybrid lavender, frankincense, fennel, hyssop, juniper, lemongrass, lemon, marjoram, malaleuca alternifolia, tangerine, melissa, mint, myrrh, oregano, patchouli, scotch pine, mugo pine, grapefruit, mountain savoury, niaouli, red thyme, rose, rosemary, rose geranium, sage, sandalwood, thyme, tagestes, ginger, ylang ylang, or combinations thereof.

In short, any chemically compatible material that emanates a pleasant or otherwise desirable odour can be used as a fragrance in the compositions and methods described herein. Particular oils may be chosen due to specific effects, such as insect repellant effects in the case of citronella, lemongrass, and/or andiroba, for example.

Fragrance materials are described more fully in S. Arctander, Fragrance Flavors and Chemicals. Vols. I and II. Author, Montclair, N.J., and the Merck Index, 8$^{th}$ Edition, Merck & Co., Inc. Rahway, N.J., both of which are incorporated herein by reference in their entirety.

The nanoemulsion compositions typically contain the fragrance component in an amount of from about 0.1% to about 30% w/w, such as from about 0.1%, about 0.5%, about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, or about 29% to about 0.5%, about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, or about 30% w/w.

The compositions described herein may contain an oil, fat, wax, or similar product in addition to or instead of a fragrance essential oil. For example, certain oils may be used to hydrate skin and/or modify the consistency of the nanoemulsion. Particular examples of oils include, but are not limited to *Carapa guianensis/andiroba* oil, coconut oil, olive oil, palm oil, palm kernel oil, sunflower seed oil, safflower oil, hemp seed oil, corn oil, macadamia seed oil, green coffee oil, kukui nut oil, jojoba seed oil, sweet almond oil, avocado oil, castor seed oil, sulfated castor oil, argan nut oil, acai berry oil, andiroba nut oil, apricot kernel oil, soybean oil, baobab seed oil, black raspberry seed oil, blackberry seed oil, blackcurrant fruit oil, blueberry seed oil, borage seed oil, broccoli seed oil, marula kernel oil, cucumber seed oil, manketti oil, passion flower seed oil, camelina seed oil, linseed seed oil, strawberry seed oil, poppy seed oil, moringa oil, rice bran oil, pomegranate oil, pumpkin seed oil, walnut seed oil, fish oil, fish liver oil, cod liver oil, shark liver oil, vegetable oil, canola oil, peanut oil, sesame oil, flaxseed oil, grape seed oil, almond oil, cottonseed oil, groundnut oil, teaseed oil, walnut oil, cashew oil, colza oil, hazelnut oil, marula oil, mongongo nut oil, pecan oil, perilla oil, pine nut oil, pistachio oil, rapeseed oil, watermelon seed oil, diacylglycerol oil, and any combination thereof.

The nanoemulsion compositions that may be added to the larvicide compositions described herein typically contain the oil component in an amount of from about 0.1% to about 30% w/w, such as from about 0.1%, about 0.5%, about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, or about 29% to about 0.5%, about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, or about 30% w/w.

As used herein, the term "emulsion" means a stable mixture of two immiscible substances in which one substance, the dispersed phase, is dispersed as tiny droplets within the other substance, the continuous phase. Typically, the emulsions described herein are oil-in-water nanoemulsions.

As used herein, the term "nanoemulsion" denotes an emulsion, typically an oil-in-water emulsion, having an average droplet size in the nanometer range. In some aspects, the nanoemulsions described herein containing a population of droplets having maximum and minimum diameters, wherein the difference between the maximum and minimum diameters does not exceed about 600 nm, about 550 nm, about 500 nm, about 450 nm, about 400 nm, about 350 nm, about 300 nm, about 250 nm, about 200 nm, about 150 nm, about 100 nm, about 90 nm, about 80 nm, about 70 nm, about 60 nm, about 50 nm, about 40 nm, about 30 nm, about 25 nm, about 20 nm, about 15 nm, about 10 nm, about 9 nm, about 8 nm, about 7 nm, about 6 nm, about 5 nm, about 4 nm, about 3 nm, about 2 nm, about 1 nm, or fewer nm.

In some aspects, droplets (e.g., fragrance- and/or oil-containing droplets) within the nanoemulsions described herein have diameters that are smaller than about 600 nm, about 550 nm, about 500 nm, about 450 nm, about 400 nm, about 350 nm, about 300 nm, about 250 nm, about 200 nm, about 150 nm, about 130 nm, about 120 nm, about 115 nm, about 110 nm, about 100 nm, about 90 nm, about 80 nm, about 75 nm, about 70 nm, about 65 nm, about 60 nm, about 55 nm, about 50 nm, about 45 nm, about 40 nm, about 35 nm, about 30 nm, about 25 nm, about 20 nm, about 15 nm, about 10 nm, about 5 nm, or fewer nm. Typically, the droplets have average diameters that are smaller than about 30 nm.

In some aspects, droplets (e.g., fragrance- and/or oil-containing droplets) within nanoemulsions described herein have diameters within the range of from about 0.1 nm to about 1000 nm, such as from about 0.1 nm, about 1 nm, about 10 nm, about 20 nm, about 30 nm, about 40 nm, about 50 nm, about 100 nm, about 200 nm, about 300 nm, about 400 nm, about 500 nm, about 600 nm, about 700 nm, about 800 nm, or about 900 nm to about 1 nm, about 10 nm, about 20 nm, about 30 nm, about 40 nm, about 50 nm, about 100 nm, about 200 nm, about 300 nm, about 400 nm, about 500 nm, about 600 nm, about 700 nm, about 800 nm, about 900 nm, or about 1000 nm. For example, the diameter may be from about 1 nm to about 100 nm, from about 20 nm to about 50 nm, from about 10 nm to about 30 nm, or from about 15 nm to about 30 nm.

In some aspects, a majority of the droplets (e.g., fragrance- and/or oil-containing droplets) within the nanoemulsions described herein have diameters below a specified size or within a specified range. In some embodiments, the majority is more than about 50%, about 60%, about 70%, about 75%, about 80%, about 85%, about 90%, about 95%, about 96%, about 97%, about 98%, about 99%, about 99.5%, about 99.6%, about 99.7%, about 99.8%, about 99.9% or more of the droplets in the nanoemulsion.

In some aspects, the nanoemulsions described herein are substantially free of droplets (e.g., fragrance- and/or oil-containing droplets) having diameters greater than about 120 nm, such as about 110 nm, about 100 nm, about 90 nm, about 80 nm, about 70 nm, about 60 nm, about 50 nm, about 40 nm, or about 30 nm.

In some aspects, the nanoemulsions described herein are stable. The term "stable" means the composition does not undergo any significant changes in average droplet size (Zeta-average), polydispersity and/or organoleptic characteristics, such as smell, pH and/or appearance, during a given period of time at two different temperatures. For example, in a stable composition, the average droplet size may vary by about ±100%, by about ±90%, by about ±80%, by about ±70%, by about ±60%, by about ±50%, by about ±40%, by about ±30%, by about ±25%, by about ±20%, by about ±15%, by about ±10%, by about ±9%, by about ±8%, by about ±7%, by about ±6%, by about ±5%, by about ±4%, by about ±3%, by about ±2%, or by about ±1%, or less.

In some aspects, the fragrance and/or oil is present partially or entirely within nanodroplets of the nanoemulsions described herein; in some aspects, the fragrance and/or oil is adsorbed on the surface of nanodroplets of the nanoemulsions described herein; in some aspects, the fragrance and/or oil is associated with the interface between the nanodroplets and the dispersion medium. In some aspects, the fragrance and/or oil is found in two or more of these locations within the nanoemulsions described herein.

The term "surfactant" is short for surface active agent. Surfactants are amphiphilic compounds, meaning they contain two or more groups that, in their pure form, are insoluble in each other. Surfactants typically have at least one hydrophobic tail and at least one hydrophilic head and, more typically, surfactants have a single hydrophobic tail and a single hydrophilic head. Surfactants typically act to lower surface tension and can provide wetting, emulsification, foam, and detergency. It will be understood that any surfactant or combination of surfactants can be used in the nanoemulsion compositions described here, provided that the surfactant(s) and fragrance can together form a nanoemulsion. Thus, the surfactants described herein can be zwitterionic, amphiphilic, cationic, anionic, non-ionic, or combinations thereof and can include two or more surfactants from one such group or from different groups. Typically, the surfactants are non-ionic, as non-ionic surfactants tend to have low sensitivity to electrolytes, particularly divalent cations, as compared to ionic surfactants, and can be used with high salinity or hard water. In addition, many non-ionic surfactants are already in use in household or cosmetic products and are well-characterized and known to be safe for the purposes and in the quantities described herein.

In aspects, the non-ionic surfactant is an ethoxylated linear alcohol, an ethoxylated alkyl phenol, fatty acid esters, an amine or an amide derivative, an alkyl polyglucoside, an ethyleneoxide/propyleneoxide copolymers, a polyalcohol or ethoxylated polyalcohol, or a thiol (mercaptans) or a derivative. In a particular aspect, the non-ionic surfactant is an ethoxylated linear alcohol. Ethoxylated linear alcohols are typically named under the International Nomenclature of Cosmetic Ingredients (INCI) system, based on the hydrocarbon from which they are derived followed by their ethylene oxide number (EON), which represents the average number of ethylene oxide groups polycondensated to the hydrocarbon tail. For example, steareth-20 is derived from stearyl alcohol and each molecule has been polyethoxylated an average of 20 times. Ceteareth-20 comprises a mixture of polyoxyethylene ethers of cetyl alcohol and stearyl alcohol, which have an average number of 20 ethylene oxide residues in the polyoxyethylene chain. Laureth-2 is derived from lauryl alcohol and contains an average number of two ethylene oxide residues in the polyoxyethylene chain.

It will be understood that the polyethoxylated surfactant may have an EON of any number, such as from about 1 to about 60, such as from 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, or 59 to 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60.

In certain aspects, when more than one polyethoxylated surfactant is used in the methods and compositions described herein, the polyethoxylated surfactants may have the same EON or may be selected so that their EON differs by at least one value. For example, the EON of the first polyethoxylated surfactant may be 1, 2, 3, 4, 5, 6, 7, 8, 9, or 10, whereas the EON of the second polyethoxylated surfactant may be 11, 12, 13, 14, 15, 16, 17, 18, 19, 20, 21, 22, 23, 24, 25, 26, 27, 28, 29, or 30. In another aspect, the EON of the two surfactants differs by a value of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, or more.

In aspects, the polyethoxylated surfactant may be saturated or unsaturated and branched or linear. Typically, the polyethoxylated surfactant is saturated and linear. The polyethoxylated surfactant may have a hydrocarbon tail length of from 5 carbons to about 40 carbons and is typically from about 12 to about 24 carbons. In certain aspects, when more than one polyethoxylated surfactant is used in the methods and compositions described herein, the polythoxylated surfactants may have the same length hydrocarbon tail or may be selected so that their hydrocarbon tail length differs by at least one value. For example, the hydrocarbon tail length of the polyethoxylated surfactants may be independently selected from 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, or more. In another aspect, the hydrocarbon tail length of the two surfactants differs by a value of about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30.

Typically, the surfactant is an ethoxylated fatty alcohol having a hydrocarbon tail comprising from about 5 to about 40 or more carbon atoms, as described above. Furthermore, when more than one surfactant is used, they may be selected to have the same or different hydrocarbon tail lengths. Likewise, the surfactant may have an EON of from about 1 to about 60, as described above and, when more than one surfactant is used, they may be selected to have the same or different EON. For example, it is contemplated to use two surfactants with the same tail lengths but different EONs; with different tail lengths but the same EONs; or with different tail lengths and different EONs. In another aspect, it is contemplated to use two surfactants with similar tail lengths and different EONs or with different tail lengths and similar EONs. It will be understood that the surfactants themselves may comprise a mixture of ethoxylated fatty alcohols, with the hydrocarbon tail length and EON specified being an average value. For example, ceteareth-20 comprises a mixture of high molecular weight ethoxylated fatty alcohols, mainly cetyl alcohol (hydrocarbon tail length of 16 carbon atoms) and stearyl alcohol (hydrocarbon tail length of 18 carbon atoms), which have been ethoxylated an average of 20 times.

In aspects, the ethoxylated fatty alcohols described herein may be referred to by the following general formula:

Where in m is representative of the hydrocarbon tail length and is from about 4 to about 40 and n is representative of the EON and is from about 1 to about 60.

The compositions described herein comprise one or more surfactants in a total amount of from about 0.5% w/w to about 20% w/w, such as from about 0.5% w/w, about 1% w/w, about 2% w/w, about 3% w/w, about 4% w/w, about 5% w/w, about 6% w/w, about 7% w/w, about 8% w/w, about 9% w/w, about 10% w/w, about 11% w/w, about 12% w/w, about 13% w/w, about 14% w/w, about 15% w/w, about 16% w/w, about 17% w/w, about 18% w/w, or about 19% w/w to about 1% w/w, about 2% w/w, about 3% w/w, about 4% w/w, about 5% w/w, about 6% w/w, about 7% w/w, about 8% w/w, about 9% w/w, about 10% w/w, about 11% w/w, about 12% w/w, about 13% w/w, about 14% w/w, about 15% w/w, about 16% w/w, about 17% w/w, about 18% w/w, about 19% w/w, or about 20% w/w. Typically, the surfactants are used in a total amount of from about 4% w/w to about 10% w/w or from about 5% w/w to about 8% w/w.

When two or more surfactants are used in combination in the compositions and methods described herein, they may be used in various ratios. For example, when two surfactants are used, they may be used in a ratio of for example, from about 0.01:0.99 to about 0.99:0.01 (w/w), such as from about 0.10:0.90 to about 0.90:0.10 (w/w); from about 0.20:0.80 to about 0.80:0.20 (w/w); from about 0.3:0.7 to about 0.7:0.3 (w/w); or from about 0.6:0.4 to about 0.4:0.6 (w/w) based on the total mass of surfactant added.

The "hydrophilic-lipophilic balance (HLB) value" of a surfactant is a measure of the degree to which the surfactant is hydrophilic or lipophilic, determined by calculating values for the different regions of the molecule. The HLB value can be used to predict the surfactant properties of a molecule. A surfactant with an HLB value of less than 10 is generally lipid-soluble (water-insoluble), whereas a surfactant with an HLB value of greater than 10 is generally water-soluble (lipid-insoluble). A surfactant with an HLB value of from about 1.5 to about 3 is generally considered an anti-foaming agent. A surfactant with an HLB value of from about 3 to about 6 is generally considered a water in oil emulsifier. A surfactant with an HLB value of from about 7 to about 9 is generally considered a wetting and spreading agent. A surfactant with an HLB value of from about 13 to about 15 is generally considered a detergent. A surfactant with an HLB value of from about 12 to about 16 is generally considered an oil in water emulsifier. A surfactant with an HLB value of from about 15 to about 18 is generally considered a solubiliser or hydrotrope. More information on HLB values can be found in Griffin, W C. (1949), Journal of the Society of Cosmetic Chemists 1 (5): 311-26; Griffin, W C. (1954), Journal of the Society of Cosmetic Chemists 5 (4): 249-56; and Davies J T (1957), Gas/Liquid and Liquid/Liquid Interface (Proceedings of the International Congress of Surface Activity): 426-38, each of which is incorporated herein by reference in its entirety.

In an aspect, the surfactant(s) used in the compositions and methods described herein are specifically chosen so that the surfactant system has an HLB value of from about 8 to about 16, such as from about 8, about 9, about 10, about 11, about 12, about 13, about 14, or about 15 to about 9, about 10, about 11, about 12, about 13, about 14, about 15, or about 16. In an aspect, if two surfactants are used in the compositions and methods described herein, one such surfactant is chosen to have an HLB in the range of from about 3 to about 9, such as from about 3, about 4, about 5, about 6, about 7, or about 8 to about 4, about 5, about 6, about 7, about 8, or about 9, and the other surfactant is chosen to have an HLB in the range of from about 12 to about 18, such as from about 12, about 13, about 14, about 15, about 16, or about 17 to about 13, about 14, about 15, about 16, about 17, or about 18. In such a situation, the relative amounts of the surfactants are then chosen to arrive at an HLB value of from about 8 to about 16, as described above. It will be understood that any number of surfactants may be used in any amounts or ratios in the compositions described herein, with their various HLB values contributing to form a surfactant system with an HLB value of from about 8 to about 16.

In another aspect, the surfactant(s) chosen for use in the compositions and methods described herein are selected to be of a character and used in an amount that will form a stable nanoemulsion, as described above. Typically, the surfactants chosen are also inexpensive and easy to obtain and work with.

Specific examples of surfactants include polyoxyethylene alkyl ethers, such as laureth-2, -3, -4, -5, -7, -9, -10, -12, -15, -20, -23, -50, ceteth-2, -3, -5, -7, -12, -13, -15, -20, -50, oleth-2, -3, -4, -5, -7, -8, -10, -12, -20, -30, -40, -50, -70, ceteareth-3, -7, -10, -15, -20, -30; trideceth-3, -4, -5, -6, -7, -8, -10, -14, octyldodeceth-5, -8, PEG-7 cocoate, PEG-9 cocoate, PEG-2 oleate, PEG-3 oleate, PEG-5 oleate, PEG-6 oleate, PEG-7 oleate, PEG-8 oleate, PEG-9 oleate, PEG-10 oleate, PEG-14 oleate, PEG-2.5 castor oil, PEG-3 castor oil, PEG-12 castor oil, PEG-13 castor oil, PEG-17 castor oil, PEG-25 castor oil, PEG-32 castor oil, PEG-35 castor oil PEG-40 castor oil, PEG-54 castor oil, PEG-10 hydrogenated castor oil, PEG-12 hydrogenated castor oil, PEG-16 hydrogenated castor oil, PEG-20 hydrogenated castor oil, PEG-30 hydrogenated castor oil, PEG-60 hydrogenated castor oil, or PEG-100 hydrogenated castor oil; glyceryl fatty esters, such as glyceryl stearate, polyglyceryl-2 laurate, polyglyceryl-2 stearate, polyglyceryl-2 oleate, polyglyceryl-10 laurate, polyglyceryl-10 stearate, or polyglyceryl-10 oleate; sorbitan fatty esters and derivatives, such as sorbitan laurate, sorbitan palmitate, sorbitan stearate, sorbitan oleate, sorbitan trioleate, polysorbate 20, polysorbate 60, polysorbate 80, or polysorbate 85; alkanol amide surfactants, such as cocamide MEA or cocamide DEA; polyoxyethyleneoxypropylene glycol copolymers, such as poloxamer 61, 62, 64, 68, or 74; polyethylene glycol and derivatives, such as PEG-200, -300, -400, -600, -800, -1000, -1500, -2000, -3000, -4000, -4000F, -6000F, -8000, -15000, PEG-1000 stearate, PEG-1500 stearate, PEG-6000 stearate, PEG-400 distearate, PEG-6000 distearate, PEG-8000 distearate, PEG-300 oleate, PEG-400 oleate, PEG-6000 oleate, PEG-200 dioleate, or PEG-400 dioleate.

It will be understood that the surfactants described herein can be in a dry form or in a liquid form. When in dry form, a "solvent" is used in which the surfactant(s) is typically soluble. Examples of suitable solvents include water, hydrocarbons, and mixtures thereof. The solvent is typically water, so that the resulting composition is non-flammable and safe to transport.

"Non-turbid" means a solution that is substantially clear or transparent to the naked eye and that may be comparable to, for example, deionized water. For example, surfactants, such as two different polyethoxylated surfactants, are combined in amounts such that a non-turbid solution is formed. In some aspects, the nanoemulsion compositions have a color, sheen, or reflection, such as a light yellow or light blue.

The term "chelator" or "chelating agent" means a molecule that can form coordinate bonds to a single metal atom—that is, it is a sequestering agent. Chelators bind to metal ions to form a metal/chelate complex and are used to mitigate changes in colour, texture, and/or fragrance in the compositions described herein. Chelating agents typically have two or more electron donating groups, and include, but are not limited to, ethylenediamine tetraacetic acid (EDTA), citric acid, tartaric acid, ascorbic acid, polyphosphates, esters or salts thereof, and combinations of any thereof. Typically, the chelator is EDTA.

The chelator, when present, is typically used in an amount of from about 0.01% to about 1% w/w, such as from about 0.01%, about 0.05%, about 0.1%, about 0.15%, about 0.2%, about 0.25%, about 0.5%, or about 0.75% to about 0.05%, about 0.1%, about 0.15%, about 0.2%, about 0.25%, 0.5%, about 0.75%, or about 1% w/w. Typically, the chelator is used in an amount of about 0.15% w/w. In aspects, a chelator is absent from the compositions described herein.

The term "antioxidant" is used herein to define compounds that typically inhibit oxidation of an oxidation susceptible compound by reacting preferentially with the oxidizing agent before the oxidizing agent reacts with the compound. The product of the reaction between the antioxidant and the oxidizing agent is typically inert or non-reactive and tasteless, colorless, and odorless so as not to affect the taste, smell, or look of the product. Water soluble antioxidants suitable for use in the nanoemulsion compositions described herein include, but are not limited to, ascorbic acid, erythorbic acid, a botanical extract, such as rosemary extract, green tea extract, or other extract containing a polyphenol antioxidant, and combinations thereof. Oil soluble antioxidants suitable for use in the nanoemulsion compositions described herein include, but are not limited to, vitamin E, tocopherols, ascorbyl palmitate, butylated hydroxyanixole (BHA), butylated hydroxytoluene (BHT), pentaerythrityl tetra-di-t-butyl hydroxyhydrocinnamate, and combinations of any thereof. Typically, the antioxidant is BHT or pentaerythrityl tetra-di-t-butyl hydroxyhydrocinnamate, commercially available as Tinogard TT™.

The antioxidant, when present, is typically used in an amount of from about 0.01% to about 1% w/w, such as from about 0.01%, about 0.05%, about 0.1%, about 0.15%, about 0.2%, about 0.25%, about 0.5%, or about 0.75% to about 0.05%, about 0.1%, about 0.15%, about 0.2%, about 0.25%, about 0.5%, about 0.75%, or about 1% w/w. Typically, the antioxidant is used in an amount of about 0.10% w/w.

The term "cosmetically acceptable and/or pharmaceutically-acceptable" means that perfumes, additives, excipients, and/or inert ingredients modified by the term are suitable for use in contact with the tissues of humans and lower animals without undue toxicity, incompatibility, instability, irritation, allergic response, and the like, commensurate with a reasonable benefit/risk ratio.

The term "non-toxic" refers to the non-occurrence of pathological phenomena as a result of using the nanoemulsion compositions described herein. The term substantially non-toxic is defined as including acceptably low toxicity as well as non-toxicity.

The term "cloud point" indicates a temperature at which the nanoemulsion composition begins to scatter light, such that the surface of the nanoemulsion composition appears cloudy or opaque.

Typically, the compositions described herein are free of or substantially free of lower alkyl alcohols. "Substantially free" herein means less than about 5%, typically less than about 2%, more typically less than about 1%, even more typically less than about 0.5%, most typically less than about 0.1% contamination with the agent in question, such as a lower alkyl alcohol.

The term "lower alkyl alcohol" means a $(C_1$ to $C_4)$ linear or branched alkyl alcohol, such as methanol, ethanol, propanol, butanol, isopropanol, 2-butanol, isobutanol, tert-butanol, ethylene glycol, propylene glycol, and glycerol.

The compositions may described herein may contain other ingredients or excipients as would be understood in the art, or they may consist essentially of or consist only of the specifically recited ingredients.

Generally, the compositions described herein are liquid, light brown in colour, have a characteristic odour, a pH of from about 2 to about 3.5, such as about 3.1, a density of from about 0.9 g/ml to about 1.2 g/ml, such as about 1.003 g/ml, a viscosity of from about 10 to about 20 cp at 25° C., such as about 15 cP at 25° C., and/or are water soluble. In specific aspects, the compositions described herein are not concentrated and are considered pre-diluted and ready-touse. The compositions are generally provided in a spray bottle, such that about 1 (about 0.75 ml) to about 5 sprays (about 3.75 ml), such as about 3 sprays (about 2.25 ml) per 1 liter of water is required to achieve the desired effect of killing mosquito larvae present in the water.

However, it will be understood that in some aspects, the compositions described herein may be formulated in any manner that can be suitably applied to standing water or other mosquito habitats. For example, the compositions described herein may be formulated as concentrated liquids, spray-dried concentrates, wettable powders, granules, dry flowables, wettable granules, water dispersible granules, pellets, non-aqueous suspensions, briquettes, water soluble pouches, tablets, floating formulations, sustained release formulations, or combinations thereof.

The compositions described herein are useful against any insect susceptible to Bt larvicidal activity. For example, the compositions described herein find particular use in killing *Aedes, Culex, Anopheles, Mansonia,* and/or *Simulium* larvae. Typical targets include mosquitoes that carry disease, such as those that carry malaria, dengue, West Nile virus, chikungunya, yellow fever, filariasis, Japanese encephalitis, Saint Louis encephalitis, Western equine encephalitis, Eastern equine encephalitis, Venezuelan equine encephalitis, La Crosse encephalitis, and/or Zika. *Aedes aegypti, Culex quiquefaciatus,* and *Simulium* spp. are typical targeted species.

This compositions described herein have been developed specifically for domestic use to reduce mosquito larvae outbreaks. This composition is non-toxic to humans and other animals or plants. As is known, Bt releases crystals that are toxic when mosquito larvae ingest them. The combination of an alkaline environment and the enzymes in the larvae midgut release the crystals' toxins, which cause cells to rupture in the larvae's gut, killing it in up to 24 hours. Bt is safe for humans and other animals, because they lack the same combination of an alkali gut and the specific enzymes necessary. Moreover, Bt has the advantage that it degrades quickly and does not persist in the environment, so even mosquitoes are unlikely to build up a resistance to it.

This compositions described herein are non-concentrated and are therefore ready-to-use with no dilution being required. The compositions should be applied directly on containers with standing water (such as potted plants, bromeliads, drains, gutters, tires, bottles) whether or not mosquito larvae is evident. Apply mainly at the edges of the containers where the larvae tend to be located. Typically, three sprays are applied for approximately every one liter of standing water (equivalent to about 2.25 mL/L).

Typically, the product should be reapplied every week. In case of rain a new application should be done. Shake well before use and do not dilute.

In understanding the scope of the present application, the articles "a", "an", "the", and "said" are intended to mean that there are one or more of the elements. Additionally, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives.

It will be understood that any aspects described as "comprising" certain components may also "consist of" or "consist essentially of," (or vice versa) wherein "consisting of" has a closed-ended or restrictive meaning and "consisting essentially of" means including the components specified but excluding other components except for materials present as impurities, unavoidable materials present as a result of processes used to provide the components, and components added for a purpose other than achieving the technical effect of the invention. For example, a composition defined using the phrase "consisting essentially of" encompasses any known pharmaceutically acceptable additive, excipient, diluent, carrier, and the like. Typically, a composition consisting essentially of a set of components will comprise less than 5% by weight, typically less than 3% by weight, more typically less than 1% by weight of non-specified components.

It will be understood that any component defined herein as being included may be explicitly excluded from the claimed invention by way of proviso or negative limitation. For example, in aspects, the use of pellets, granules, briquettes, or other solid compositions are explicitly excluded from the compositions and methods described herein. In other aspects, the use of bacteria species other than Bt, such as *Bacillus sphaericus*, is explicitly excluded from the compositions and methods described herein.

In addition, all ranges given herein include the end of the ranges and also any intermediate range points, whether explicitly stated or not.

Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

Methods of Producing Larvicide Compositions

The compositions described herein, in aspects, are prepared by culturing the Bt under conditions that promote entering of stationary phase, such that the bacteria will begin to sporulate and produce Cry proteins. For example, the Bt are typically cultured at about 30° C., with agitation of about 200 rpm, and at a pH of about 7.0. When nutrients become scarce, the cells begin to sporulate.

The resultant fermentate is typically mixed with a portion of the final amount of water to be added. For example, about one quarter, one third, or one half of the water may be used. With low speed mixing, the fermentate is added to the water, mixed, and the preservative, e.g., propionic acid, is added. Finally, the remaining portion of the water is added to produce a non-concentrated, ready-to-use, sprayable composition.

Methods of Producing Nanoemulsion Compositions

The nanoemulsion compositions described herein can be made by any known method. In one aspect, the nanoemulsion compositions are made by mixing one or more surfactants with a fragrance and an optional antioxidant and heating. When the temperature reaches about 70° C., a portion of an aqueous medium, such as water, is added. The composition is further mixed and heat to about 100° C. This temperature is maintained for a period of time, after which the remaining portion of the aqueous medium, such as water, is added, and the composition is quickly cooled. Any further desired excipients or additives, such as preservatives can be added at that time, with stirring or mixing to enhance solubilization. This method tends to result in a nanoemulsion with a smaller diameter size, such as less than about 100 nm.

In another aspect, the nanoemulsions are made by mixing the oil phase components and heating to from about 85° C. to about 95° C., mixing the aqueous phase components and heating to from about 85° C. to about 95° C., then adding the aqueous phase to the oil phase. The mixture is stirred for about 15 minutes and is then quickly cooled to about ambient temperature. Any further desired excipients or additives, such as preservatives can be added at that time, with stirring or mixing to enhance solubilization. This method tends to result in a nanoemulsion with a larger diameter size, such as from about 100 to about 300 nm.

In an aspect, the nanoemulsion compositions are prepared in a reactor in a water bath with a mechanical stirring mechanism. The one or more surfactants, fragrance and/or oil, and optional antioxidant are heated in the reactor with stirring to a temperature of from about 40° C. to about 80° C., such as from about 40° C., about 45° C., about 50° C., about 55° C., about 60° C., about 65° C., about 70° C., or about 75° C., to about 45° C., about 50° C., about 55° C., about 60° C., about 65° C., about 70° C., about 75° C., or about 80° C. In typical aspects, the one or more surfactants, fragrance, and optional antioxidant are heated to a temperature of about 70° C. In other typical aspects, the one or more surfactants, oil, and optional antioxidant are heated to a temperature of about 85° C. to about 95° C.

The portion of the aqueous medium that is added to the mixture of the one or more surfactants, fragrance and/or oil, and optional antioxidant is from about 20% to about 80% of the total amount to be added, such as from about 20%, about 25%, about 30%, about 35%, about 40%, about 45%, about 50%, about 55%, about 60%, about 65%, about 70%, or about 75% to about 25%, about 30%, about 35%, about 40%, about 45%, about 50%, about 55%, about 60%, about 65%, about 70%, about 75%, or about 80% of the total amount to be added. Typically, about 40% of the total amount of the aqueous medium is added.

Next, the mixture is further heated to the temperature at which the cloud point of the mixture is observed. In an aspect, this temperature is from about 85° C. to about 100° C., such as from about 85° C., about 86° C., about 87° C., about 88° C., about 89° C., about 90° C., about 91° C., about 92° C., about 93° C., about 94° C., about 95° C., about 96° C., about 97° C., about 98° C., or about 99° C. to about 86° C., about 87° C., about 88° C., about 89° C., about 90° C., about 91° C., about 92° C., about 93° C., about 94° C., about 95° C., about 96° C., about 97° C., about 98° C., about 99° C., or about 100° C. Typically, the cloud point is observed at about 95° C.

The cloud point temperature is maintained for a period of time, such as from about 1 to about 15 minutes, such as from about 1 minute, about 2 minutes, about 3 minutes, about 4 minutes, about 5 minutes, about 6 minutes, about 7 minutes, about 8 minutes, about 9 minutes, about 10 minutes, about 11 minutes, about 12 minutes, about 13 minutes, or about 14 minutes to about 2 minutes, about 3 minutes, about 4 minutes, about 5 minutes, about 6 minutes, about 7 minutes, about 8 minutes, about 9 minutes, about 10 minutes, about 11 minutes, about 12 minutes, about 13 minutes, about 14 minutes, or about 15 minutes. In typical aspects, the cloud point temperature is maintained for about 5 minutes. In other typical aspects, the cloud point temperature is maintained for about 10 minutes. In other typical aspects, the cloud point temperature is maintained for about 15 minutes.

The composition is then quickly cooled, typically with the aid of a cooling system adapted to the reactor. Additionally, the remaining portion of the aqueous medium, at room temperature, is added. In an aspect, the composition is cooled to a desired temperature of from about 25° C. to about 60° C., such as from about 25° C., about 30° C., about 35° C., about 40° C., about 45° C., about 50° C., or about 55° C. to about 30° C., about 35° C., about 40° C., about 45° C., about 50° C., about 55° C., or about 60° C. Typically, the composition is cooled to a temperature of about 40° C.

Once the composition is cooled to the desired temperature, such as about 40° C., any further excipients and/or additives are added, such as a preservative. The further excipients and/or additives are typically added with stirring so that they are completely solubilized in the composition.

Nanoemulsion compositions produced by the methods described herein are, in aspects, non-toxic, suitable for use on human bodies, and/or non-flammable.

Methods of Use

The compositions described herein may be administered to any standing body of water or otherwise any potential or known mosquito habitat. Typically, the composition is provided in a ready-to-use format in a spray bottle, so that no mixing or dilution is required by the end user. This makes the composition easy to use and accessible to individuals for domestic use.

The amount of the composition to be used is typically measured by the number of sprays. Depending upon the construction of the spray bottle, a different amount of composition may be administered. For the purposes of the compositions described herein, it is assumed that one spray equals about 0.75 ml. However, it will be understood that larger or smaller spray volumes may be used with a corresponding increase or decrease in the number of sprays being required.

Thus, typically about 3×0.75 ml sprays may be used for every approximate 1 liter of standing water. In a typical domestic environment, there may be small pools of water, potted plants, bromeliads, drains, gutters, tires, or bottles, for example, that could be suitable breeding grounds for insect larvae. These small pools of water may be suitably sprayed with the compositions described herein to kill larvae that may present, therefore preventing the insects, such as mosquitos, from developing into adulthood and spreading diseases.

The compositions described herein may, in aspects, be administered in combination, concurrently or sequentially, with conventional larvicides or insect repellants. The compositions described herein may be formulated together with such conventional larvicides or insect repellants when appropriate.

In specific aspects, the compositions described herein may be used in combination, concurrently or sequentially, with the nanoemulsion compositions described in PCT/BR2016/050253, incorporated herein by reference in its entirety. These two compositions may be formulated together or may be provided as separate formulations, sold individually or as a kit. Thus, the combination may not only kill larvae present in a water reservoir but may also prevent mosquitos from laying new eggs in that reservoir. In an aspect, this combination result in a synergistic effect on reducing mosquito populations and/or reducing the spread of mosquito-borne disease.

The compositions described herein may be used in any suitable amount, but are typically sprayed in amounts of from about 0.5 ml to about 5 ml per liter of standing water, such as from about 0.75 ml to about 3.75 ml, such as about 2.25 ml. In aspects, one spray of the composition comprises about 0.75 ml, and about 1 to about 5 sprays, such as 1, 2, 3, 4, or 5 sprays are used for every 1 liter of standing water to be treated.

Additionally, the compositions described herein may be used daily, weekly, biweekly, or monthly, and/or after each rainfall. Typically, the compositions are sprayed once weekly and after each rainfall.

The above disclosure generally describes the present invention. A more complete understanding can be obtained by reference to the following specific Examples. These Examples are described solely for purposes of illustration and are not intended to limit the scope of the invention. Changes in form and substitution of equivalents are contemplated as circumstances may suggest or render expedient. Although specific terms have been employed herein, such terms are intended in a descriptive sense and not for purposes of limitation.

EXAMPLES

Example 1—Production of a Ready-to-Use Bti Composition

Cultivation of Bti

The microorganism Bti was grown in a 7.5 L bioreactor (3 L working volume) under controlled culture conditions, using a temperature of 30° C., agitation of 200 rpm, and pH 7.0. The cells were cultured until they entered the stationary phase, where nutrient conditions are already scarce and the cells begin to sporulate and produce the protein crystals toxic to mosquito larvae.

Formulation

In a vessel containing ⅓ volume distilled water with mixing at low speed, the Bti fermentate was added slowly. The preservative was added and the final formulation was completed with the diluent, using the components listed in Table 1 below.

TABLE 1

Components used in the Bti composition of Example 1.

| Component | Quantity (% w/w) | | | CAS No. | Purpose |
| --- | --- | --- | --- | --- | --- |
| | Min. | Average | Max. | | |
| Bti Fermentate | 0.56 | 0.66 | 0.75 | 68038-71-1 | Active ingredient |
| Propanoic Acid | 0.6 | 0.8 | 0.9 | 79-09-4 | Preservative |
| Water | 98.84 | 98.54 | 98.35 | 7732-18 | Diluent |

This formulation was approved as a biological larvicide for domestic use under ANVISA Reg. No: 3.4186.0006.001-7.

Physical and Chemical Properties
   Physical description: Liquid
   Colour: Light brown
   Odour: Characteristic
   pH: 3.10
   Density: 1.003 g/mL.
   Viscosity: 15 cP. under 25° C.
   Solubility: Soluble in water Efficacy Against *Aedes aegipty* Larvae The test was performed according the ANVISA Manual of protocols for testing effectiveness in biological larvicidal products. Briefly, the composition described herein was sprayed three times per 1 liter of water (equivalent to about 2.25 ml/l water). *Aedes aegipty* larvae at the beginning of the fourth instar were exposed to the composition for a 48-hour evaluation period. The same procedure was performed for the control treatment (water). The result was considered satisfactory if the mean value of mortality was 90±10%.

According to the results obtained and under the conditions of the test, it was concluded that the composition described herein showed satisfactory efficacy for the control of larvae of *Aedes aegipty* (Table 2, below).

TABLE 2

Efficacy test results

| Treatment | Evaluation period | Total Mortality | | | | | | Mortality (%) |
| --- | --- | --- | --- | --- | --- | --- | --- | --- |
| | | Larvae | | Pupa | | Alados | | |
| | | Alive | Dead | Alive | Dead | Alive | Dead | |
| Biological larvicide | 24 hours | 3 | 97 | 0 | 0 | 0 | 0 | 96.63% |
| Control | | 89 | 11 | 0 | 0 | 0 | 0 | |
| Biological larvicide | 48 hours | 0 | 100 | 0 | 0 | 0 | 0 | 100% |
| Control | | 89 | 11 | 0 | 0 | 0 | 0 | |

Larvae Mortality Tests

Activity of three different formulations were evaluated in the laboratory against fourth instar larvae of *Aedes aegypti*. Concentrations of 0.2%, 1%, and 2% (w/w) of Bti fermentate were tested in the same base using 0.8% of preservative (propionic acid) and completed with diluent.

Figure 1:
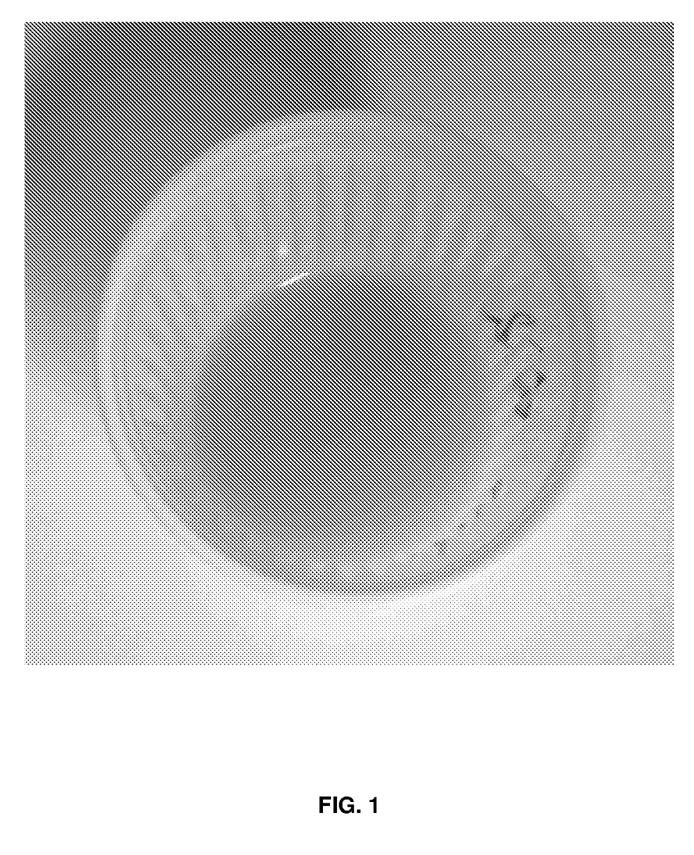
Figure 2:
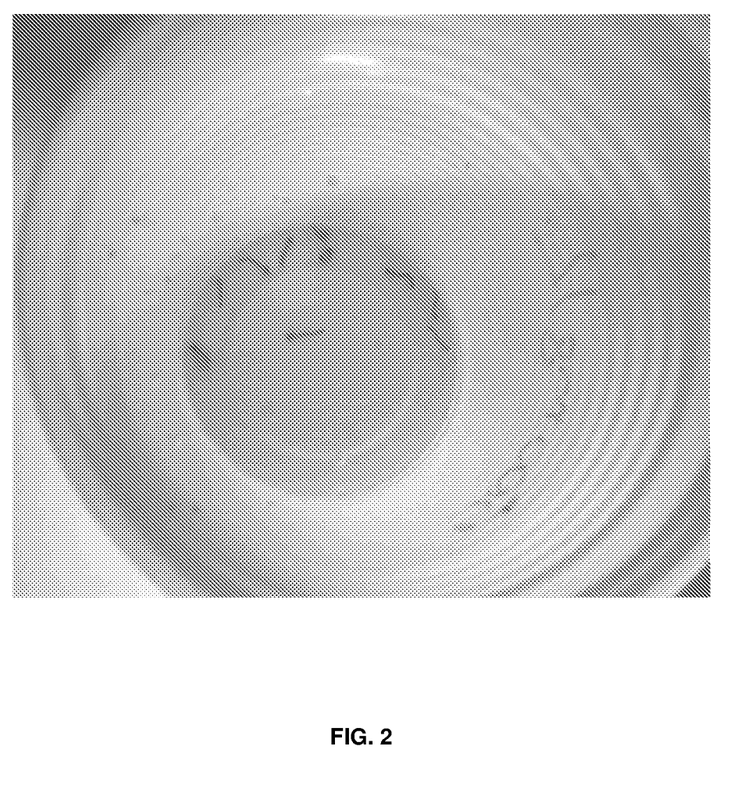
Figure 3:
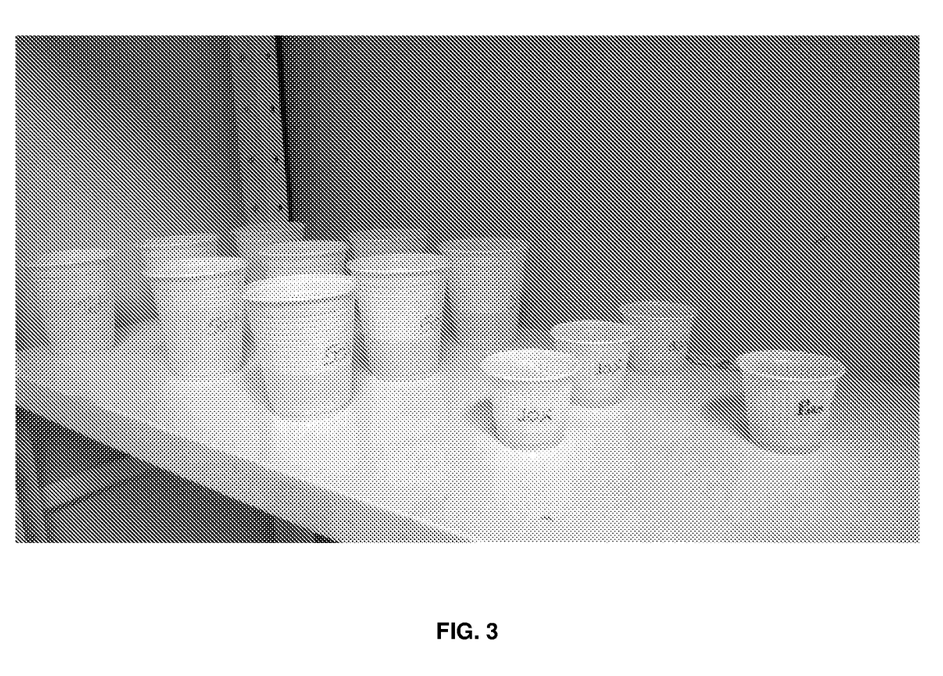

Three 10 ml replicates of the composition were placed in plastic cups, and 6 or 10 larvae were added to each cup. One cup with distilled water served as a control. No food was added during the test period. Tests were conducted at 26±2° C., and larvae mortality was recorded after 24 and 48 hours (FIGS. 1, 2, and 3). The composition resulted in 100% mortality within 24 hours for all formulations.

There were no mortalities in the control test and no pupae formation occurred throughout the test at 48 hours.

The above disclosure generally describes the present invention. Although specific terms have been employed herein, such terms are intended in a descriptive sense and not for purposes of limitation.

All publications, patents and patent applications cited above are herein incorporated by reference in their entirety to the same extent as if each individual publication, patent or patent application was specifically and individually indicated to be incorporated by reference in its entirety.

Although preferred embodiments of the invention have been described herein in detail, it will be understood by those skilled in the art that variations may be made there to without departing from the spirit of the invention or the scope of the appended claims.

The invention claimed is:

1. A ready-to-use liquid larvicide composition consisting essentially of *Bacillus thuringiensis* (Bt) fermentate, propionic acid, and water.

2. The composition of claim 1, wherein the Bt is subsp. *israelensis*.

3. The composition of claim 1, wherein the Bt fermentate is used in an amount of from about 0.56 to about 0.75% w/w of the composition.

4. The composition of claim 1, wherein the propionic acid is used in an amount of from about 0.6 to about 0.9% w/w of the composition.

5. The composition of claim 1, wherein the water is used in an amount of from about 83.75 to about 113.32% w/w of the composition.

6. The composition of claim 1, having at least one of the following characteristics: a colour of light brown; a pH of about 3.10; a density of about 1.003 g/ml; a viscosity of about 15 cP at 25° C.; and water soluble.

7. A method of killing mosquito larvae, the method comprising spraying the composition of claim 1 on standing water.

8. The method of claim 7, wherein about 3 sprays and/or about 2.25 ml of the composition is applied for each 1 liter of water.

\* \* \* \* \*